(No Model.)
W. H. KRETSINGER.
Manufacture of Rakes.
No. 233,679.  Patented Oct. 26, 1880.
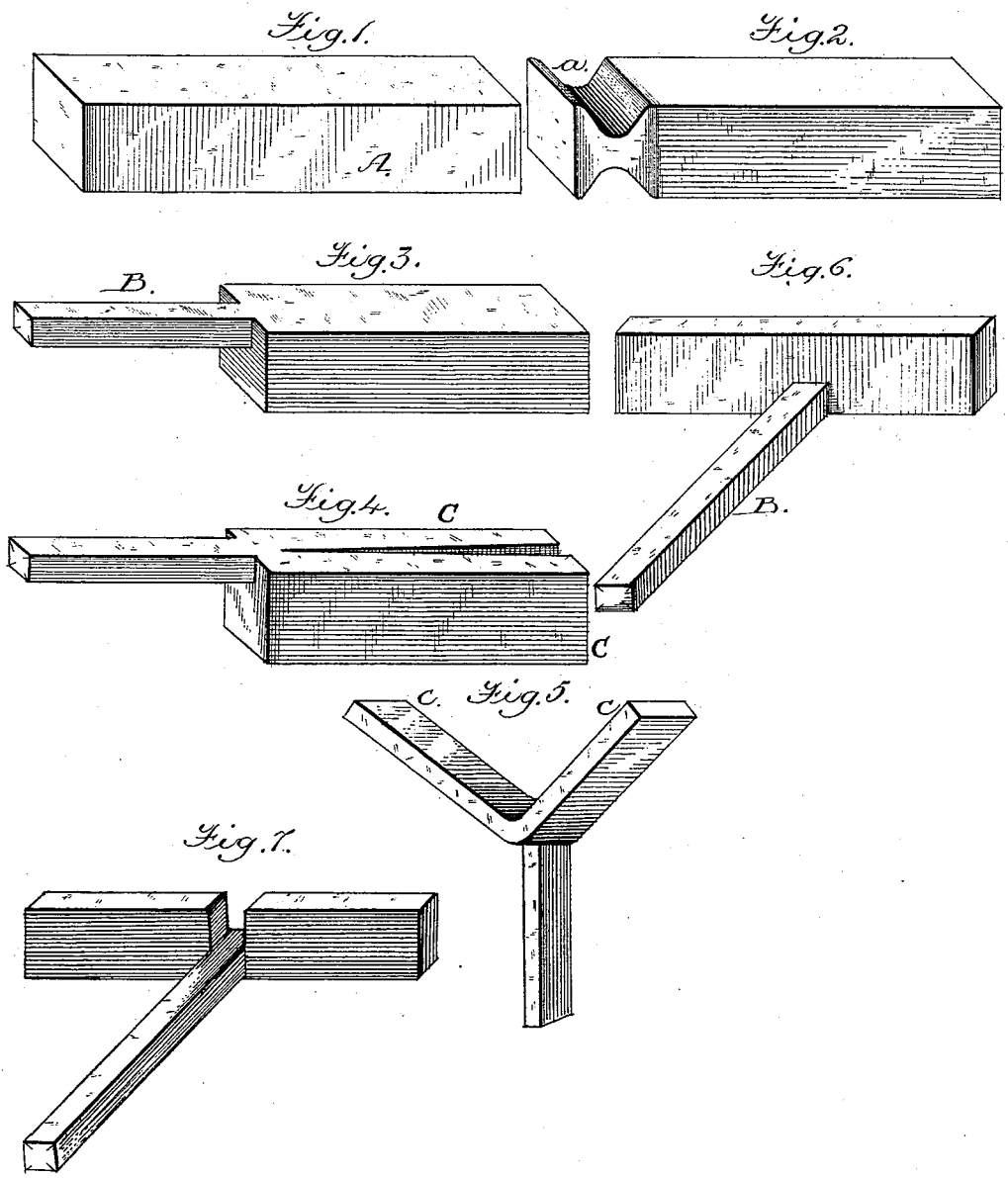
Witnesses:
J. Walter Fowler,
W. H. Morsell
Inventor:
Wm H. Kretsinger
by his attys
A. H. Evans & Co.

UNITED STATES PATENT OFFICE.

WILLIAM H. KRETSINGER, OF FORT MADISON, IOWA.

MANUFACTURE OF RAKES.

SPECIFICATION forming part of Letters Patent No. 233,679, dated October 26, 1880.

Application filed June 30, 1880. (No model.)

*To all whom it may concern:*

Be it known that I, WILLIAM H. KRETSINGER, of Fort Madison, county of Lee, and State of Iowa, have invented certain new and useful Improvements in the Method of Forming Metal Rakes from a Single Pattern or Blank; and I hereby declare the following to be a full, clear, and exact description thereof, reference being had to the accompanying drawings, making part of this specification, and in which—

Figure 1 represents the pattern or blank. Fig. 2 shows the same cut or pressed down a proper distance from the end to give metal sufficient to form the shank of the rake. Fig. 3 shows the shank formed or drawn out. Fig. 4 shows the blank split for forming the head. Fig. 5 shows the parts partially opened out. Fig. 6 shows the parts forced out at right angles to the shank to form the head. Fig. 7 shows the center of the head "set down" sufficiently to form the space between the two middle teeth.

My invention relates, principally, to the manufacture of steel rakes from a single piece of metal; and it consists in the method of forming the same, as hereinafter explained and claimed.

To enable others skilled in the art to make and use my invention, I will proceed to describe the exact manner in which I have carried it out.

My invention consists in an improvement in the art of making metal rakes from a blank bar of suitable dimensions at one end to form the head when split and opened out and the parts extended in opposite directions and at right angles to the tang, which is formed from the opposite end of the blank. The head portion is split in the direction of the axis of the tang portion, and in a plane coincident with the direction the teeth are to have, thus avoiding the necessity of altering the relation of the tang to the head by twisting the head or bending the tang.

In the drawings, A represents the blank or pattern from which the rake is to be made. This blank is just double the thickness of the rake-head, and of a breadth equal to the length of the teeth plus the breadth of the head.

At one end of the blank a sufficient quantity of the metal *a* is cut or pressed down on three sides a proper distance, from which to form the shank B, as shown in Fig. 2. This metal *a* is then drawn out into the shank B, as shown in Fig. 3, after which I split the rest of the blank up to, or nearly up to, the shank, as shown in Fig. 4. The two parts C C are then opened out, as shown in Fig. 5, and finally pressed or otherwise forced out at right angles to the shank, as shown in Fig. 6.

The center of the head is set down or indented a sufficient width, as shown in Fig. 7, to form the space between the two middle teeth, and then I "true up" or finish up the parts ready for cutting the teeth.

It is evident the "set down" in the center may be done after the head is trued up, if preferred. After this process has been gone through with, the teeth of the rake can be cut ready for drawing under the hammer in the usual way.

I am aware that rake-heads have been made of flat plates of steel of just the thickness designed for the head and of double the width and the shank forced down to a position at right angles to the head, and such I do not claim as my invention.

Having thus explained my invention, what I claim as new, and desire to secure by Letters Patent, is—

As an improvement in the manufacture of rake-heads, the method of forming the rakes from a single blank of double the thickness of the head, and of a breadth equal to the length of the teeth plus the breadth of the head, the blank being split in the direction of the plane of the teeth, substantially as herein shown and described.

WILLIAM H. KRETSINGER.

Attest:
EKIN SMITH,
F. S. KRETSINGER.